United States Patent
Kula

(10) Patent No.: US 12,003,538 B2
(45) Date of Patent: *Jun. 4, 2024

(54) METHODS AND SYSTEMS FOR BROWSER SPOOFING MITIGATION

(71) Applicant: TD Ameritrade IP Company, Inc., Omaha, NE (US)

(72) Inventor: John Scott Kula, Sinking Spring, PA (US)

(73) Assignee: CHARLES SCHWAB & CO., INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/067,182

(22) Filed: Dec. 16, 2022

(65) Prior Publication Data

US 2023/0124357 A1 Apr. 20, 2023

Related U.S. Application Data

(63) Continuation of application No. 16/794,161, filed on Feb. 18, 2020, now Pat. No. 11,539,746.

(51) Int. Cl.
*H04L 9/40* (2022.01)
*H04L 67/02* (2022.01)
*H04L 67/54* (2022.01)

(52) U.S. Cl.
CPC ........ *H04L 63/1483* (2013.01); *H04L 63/083* (2013.01); *H04L 67/02* (2013.01); *H04L 67/54* (2022.05)

(58) Field of Classification Search
CPC ... H04L 67/02; H04L 9/3247; H04L 63/1433; H04L 63/1416
See application file for complete search history.

(56) References Cited

U.S. PATENT DOCUMENTS

| | | |
|---|---|---|
| 7,971,264 B2 | 6/2011 | Sullivan |
| 8,244,799 B1 | 8/2012 | Salusky et al. |
| 8,498,940 B2 | 7/2013 | Pelegero et al. |
| 9,021,555 B2* | 4/2015 | Kato ............... G06F 21/31 726/3 |
| 9,032,098 B2* | 5/2015 | Van De Poel ...... H04L 41/0853 709/224 |
| 10,715,539 B1 | 7/2020 | Weldon |

(Continued)

*Primary Examiner* — Chirag R Patel
(74) *Attorney, Agent, or Firm* — Harness, Dickey & Pierce, P.L.C.

(57) ABSTRACT

An authentication system includes an authentication module and a user history database storing order information that includes, for each of multiple logins of the first user to a web property, at least one of: an indication of an order of hypertext transfer protocol (HTTP) headers that were previously received at the authentication module during the login, and an indication of an order of navigator object properties that were previously returned to the authentication module during the login. The authentication module is configured to: receive, from a web browser of a first entity attempting to log in to the web property, credentials of the first user; determine order information of the first entity's web browser; perform a comparison operation based on the order information of the first user and that of the first entity, and determine whether to allow the first entity to log in based on the comparison operation.

17 Claims, 5 Drawing Sheets

(56) References Cited

U.S. PATENT DOCUMENTS

| | | |
|---|---|---|
| 2012/0131143 A1* | 5/2012 | Nakazawa ............ H04L 9/3271 |
| | | 709/218 |
| 2012/0210413 A1* | 8/2012 | Akula ................. H04L 63/0815 |
| | | 726/8 |
| 2014/0122647 A1 | 5/2014 | Mischook et al. |
| 2017/0346830 A1 | 11/2017 | Goldfarb et al. |
| 2018/0083994 A1 | 3/2018 | Armstrong et al. |
| 2020/0137092 A1 | 4/2020 | Yan et al. |
| 2020/0236102 A1* | 7/2020 | Azulay .................. H04L 67/02 |

\* cited by examiner

300

| Login. No. | HTTP Header Order | Navigator Object Property Order | Order Hash |
|---|---|---|---|
| 1 | Host, Connection, User Agent, Accept, Referer, Accept-Language . . . | userAgent, product, language, appCodeName, appVersion, cookieEnabled . . . | d75812 . . . . |
| 2 | Host, Connection, Accept, Accept-Language, User Agent, Accept-Encoding . . . | platform, userAgent, geolocation, appVersion, language, appName . . . | ca125d . . . . |
| 3 | Host, Connection, User Agent, Accept, Referer, Accept-Language . . . | userAgent, product, language, appCodeName, appVersion, cookieEnabled . . . | d75812 . . . . |
| 4 | Host, Connection, User Agent, Accept, Referer, Accept-Language . . . | userAgent, product, language, appCodeName, appVersion, cookieEnabled . . . | d75812 . . . . |

310 → Login. No.
320 → HTTP Header Order
330 → Navigator Object Property Order
340 → Order Hash

FIG. 3

METHODS AND SYSTEMS FOR BROWSER SPOOFING MITIGATION

CROSS-REFERENCE TO RELATED APPLICATIONS

This application is a continuation of U.S. patent application Ser. No. 16/794,161 filed Feb. 18, 2020, the entire disclosure of which is incorporated by reference.

FIELD

The present disclosure relates to systems and methods for analyzing network data and more particularly to systems and methods for detecting and combatting browser spoofing.

BACKGROUND

Sometimes, malicious actors impersonate legitimate users of a web property by using compromised credentials of the legitimate users. One method of determining whether an entity attempting to interact with the web property is a legitimate user or a malicious actor impersonating the legitimate user involves identifying a range of information about a web browser being used by the entity to interact with the web property. This identified range of web browser information, which is often referred to as a device (or browser) fingerprint (or print), is then compared against historical data that has been collected for that legitimate user during prior logins of the legitimate user.

Over time, malicious actors realized that they needed to present a range of web browser information (or device prints) that is similar to that presented by a legitimate user they are attempting to impersonate when the legitimate user accesses a web property. Otherwise, the impersonation attempt would be quickly detected and defeated. To counter such detection, malicious actors often use malware that has been explicitly created to harvest web browser information of legitimate users as well as credentials. Malicious actors then attempt to bypass detection by performing browser spoofing, which includes, for example, presenting, or playing back, a number of parameters from the harvested web browser information when logging in using the legitimate user's credentials. Performing browser spoofing by presenting, or playing back, these web browser parameters is often sufficient to bypass manual screeners as well as many fraud detection algorithms, including machine learning-based fraud detection algorithms.

When a malicious actor successfully gains access to a web property by impersonating a legitimate user, actions performed by the malicious actor can be very damaging and/or costly for both the legitimate user and a company that owns the web property.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to at least some example embodiments, an authentication system includes an authentication module; and a user history database storing order information of a first user. The order information of the first user includes, for each login, among a plurality of times the first user logged in to a web property associated with the authentication system, at least one of: an indication of an order of hypertext transfer protocol (HTTP) headers that were previously received at the authentication module from a web browser of the first user during the login, and an indication of an order of navigator object properties that were previously returned to the authentication module by a web browser of the first user during the login. The authentication module is configured to: receive, from a web browser of a first entity attempting to log in to the web property, credentials of the first user, determine order information of the web browser of the first entity, perform a comparison operation based on the order information of the first user and the order information of the first entity, and determine whether or not to allow the first entity to log in to the web property based on a result of the comparison operation.

The authentication module may be further configured to receive an HTTP request from the web browser of the first entity, and respond to the HTTP request by sending to the web browser of the first entity a hypertext markup language (HTML) document defining a webpage. The HTML document may include code for causing the web browser of the first entity to send to the authentication module navigator object property information indicating an order of properties of a navigator object of the web browser of the first entity.

The authentication module may be further configured to request one or more authentication factors from the first entity, in addition to the credentials of the first user, based on the result of the comparison operation.

The order information of the web browser of the first entity may include at least one of: an indication of an order of HTTP headers included in an HTTP request of the web browser of the first entity, and an indication of an order of navigator object properties of the web browser of the first entity.

The authentication module may be further configured such that the comparison operation includes at least one of: determining whether the order of HTTP headers included in an HTTP request of the web browser of the first entity matches at least one of the orders of HTTP headers indicated by the order information of the first user, and determining whether the order of navigator object properties of the web browser of the first entity matches at least one of the orders of navigator object properties indicated by the order information of the first user.

According to at least some example embodiments, an authentication system includes an authentication module; and a reference database storing reference order information. The reference order information includes, for each web browser type among a plurality of web browser types, at least one of: an indication of an order of hypertext transfer protocol (HTTP) headers included in an HTTP request of the web browser type, and an indication of an order of navigator object properties of the web browser type. The authentication module is configured to: receive, from a web browser of a first entity attempting to log in to a web property, credentials of a first user, determine order information of the web browser of the first entity, perform a comparison operation based on the reference order information and the order information of the first entity, and determine whether or not to allow the first entity to log in to the web property based on a result of the comparison operation.

The authentication module may be further configured to: receive an HTTP request from the web browser of the first entity, and respond to the HTTP request by sending to the web browser of the first entity a hypertext markup language (HTML) document defining a webpage. Further, the HTML document may include code for causing the web browser of the first entity to send to the authentication module navigator object property information indicating an order of properties of a navigator object of the web browser of the first entity.

The authentication module may be further configured to request one or more authentication factors from the first entity, in addition to the credentials of the first user, based on the result of the comparison operation.

The order information of the web browser of the first entity may include at least one of: an indication of an order of HTTP headers included in an HTTP request of the web browser of the first entity, and an indication of an order of navigator object properties of the web browser of the first entity.

The authentication module may be further configured such that the comparison operation includes at least one of: determining whether a browser type, from among the plurality of browser types, that corresponds to the order of HTTP headers included in an HTTP request of the web browser of the first entity matches a browser type identified by a user agent HTTP header of the web browser of the first entity or a user agent property of the navigator object properties of the web browser of the first entity, and determining whether a browser type, from among the plurality of browser types, that corresponds to the order of navigator object properties of the web browser of the first entity matches a browser type identified by the user agent HTTP header of the web browser of the first entity or the user agent property of the navigator object properties of the web browser of the first entity.

According to at least some example embodiments, a method of operating an authentication system is provided. The authentication system includes an authentication module and a user history database storing order information of a first user. The method of operating the authentication system includes receiving, from a web browser of a first entity attempting to log in to a web property, credentials of the first user; and determining order information of the web browser of the first entity. The method further includes performing a comparison operation based on the order information of the first user and the order information of the first entity; and determining whether or not to allow the first entity to log in to the web property based on a result of the comparison operation. The order information of the first user includes, for each login, among a plurality of times the first user logged in to the web property associated with the authentication system, at least one of an indication of an order of hypertext transfer protocol (HTTP) headers that were previously received at the authentication module from a web browser of the first user during the login, and an indication of an order of navigator object properties that were previously returned to the authentication module by a web browser of the first user during the login.

The method may further include receiving an HTTP request from the web browser of the first entity, and responding to the HTTP request by sending to the web browser of the first entity a hypertext markup language (HTML) document defining a webpage. The HTML document may include code for causing the web browser of the first entity to send to the authentication module navigator object property information indicating an order of properties of a navigator object of the web browser of the first entity.

The method may further include requesting one or more authentication factors from the first entity, in addition to the credentials of the first user, based on the result of the comparison operation.

The order information of the web browser of the first entity may include at least one of an indication of an order of HTTP headers included in an HTTP request of the web browser of the first entity, and an indication of an order of navigator object properties of the web browser of the first entity.

The comparison operation may include at least one of: determining whether the order of HTTP headers included in an HTTP request of the web browser of the first entity matches at least one of the orders of HTTP headers indicated by the order information of the first user, and determining whether the order of navigator object properties of the web browser of the first entity matches at least one of the orders of navigator object properties indicated by the order information of the first user.

According to at least some example embodiments, a method of operating an authentication system is provided. The authentication system includes an authentication module and a reference database storing reference order information. The method of operating the authentication system includes receiving, from a web browser of a first entity attempting to log in to a web property, credentials of a first user; and determining order information of the web browser of the first entity. The method further includes performing a comparison operation based on the reference order information and the order information of the first entity; and determining whether or not to allow the first entity to log in to the web property based on a result of the comparison operation. The reference order information includes, for each web browser type among a plurality of web browser types, at least one of: an indication of an order of hypertext transfer protocol (HTTP) headers included in an HTTP request of the web browser type, and an indication of an order of navigator object properties of the web browser type.

The method may further include receiving an HTTP request from the web browser of the first entity; and responding to the HTTP request by sending to the web browser of the first entity an HTML document defining a webpage. The HTML document may include code for causing the web browser of the first entity to send to the authentication module navigator object property information indicating an order of properties of a navigator object of the web browser of the first entity.

The method may further include requesting one or more authentication factors from the first entity, in addition to the credentials of the first user, based on the result of the comparison operation.

The order information of the web browser of the first entity may include at least one of: an indication of an order of HTTP headers included in an HTTP request of the web browser of the first entity, and an indication of an order of navigator object properties of the web browser of the first entity.

The comparison operation may include at least one of: determining whether a browser type, from among the plurality of browser types, that corresponds to the order of HTTP headers included in an HTTP request of the web browser of the first entity matches a browser type identified by a user agent HTTP header of the web browser of the first entity or a user agent property of the navigator object properties of the web browser of the first entity, and determining whether a browser type, from among the plurality of browser types, that corresponds to the order of navigator object properties of the web browser of the first entity matches a browser type identified by the user agent HTTP header of the web browser of the first entity or the user agent property of the navigator object properties of the web browser of the first entity.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 3 illustrates example contents of the user history database according to the principles of the present disclosure.

In the drawings, reference numbers may be reused to identify similar and/or identical elements.

DETAILED DESCRIPTION

Figure 1:
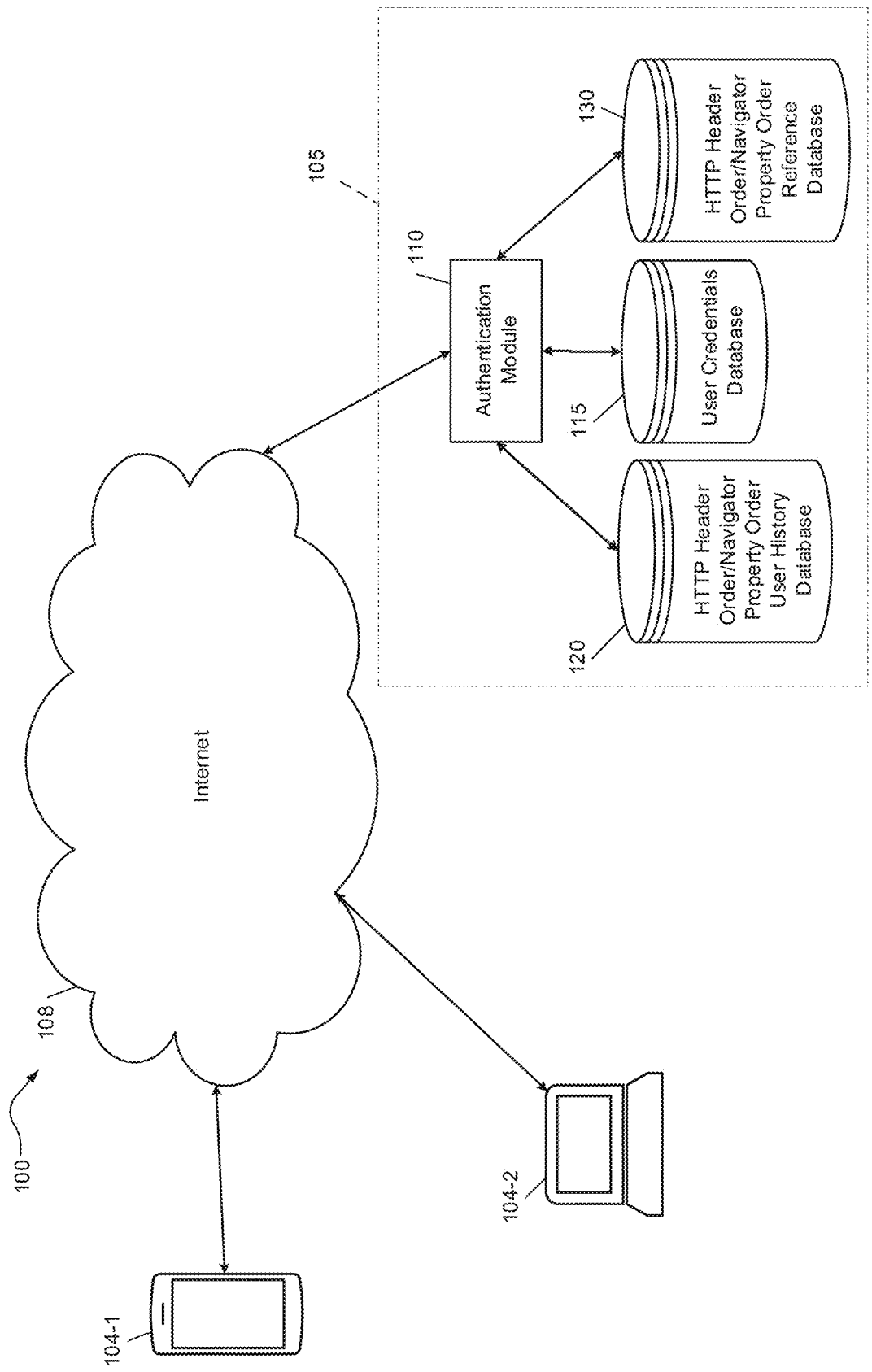
FIG. 1 is a functional block diagram of an example authentication environment according to the principles of the present disclosure.

The present disclosure describes an authentication system that implements a unique and computationally efficient approach to detecting potential "browser spoofing" where a malicious actor attempts to impersonate a legitimate user by playing back web browser parameters harvested from the legitimate user. Malicious actors use browser spoofing, while attempting to access a web property by using compromised credentials of the legitimate user, in order to defeat fraud detection procedures that are based on checking device fingerprints against previously obtained device fingerprints of the legitimate user.

Once the authentication system detects potential browser spoofing, additional fraud prevention operation may be used to prevent malicious actors from accessing the web property. The additional fraud prevention operations may include, for example, requiring multi-factor authentication (e.g., two-factor authentication) by requesting one or more authentication factors in addition to the user credentials (e.g., user name and password). Examples of additional authentication factors include, but are not limited to, requiring entry of a one-time password or code generated by an authenticator application installed on the legitimate user's phone or computer or emailed to the legitimate user's email address, and requiring entry of biometric data (e.g., fingerprint(s), iris scan, facial recognition, voice recognition, etc.) to check against previously registered biometric data of the legitimate user. Obtaining and providing these additional factors is significantly more difficult than harvesting the web browser parameters necessary to attempt browser spoofing. Thus, in general, successfully passing these additional fraud protection procedures would be relatively simple for the legitimate user while also being significantly difficult for a malicious actor.

There are at least two methods by which a malicious actor can modify the data that is returned by a browser (e.g., when attempting to perform browser spoofing).

In the first return data modification method, a program outside the browser, often in the form of a proxy, is used to modify the return traffic in the requests. This can be done manually or automatically. For example when the program sees the browser returning a user agent, say in the format of "User Agent: Mozilla/5.0 (Windows NT . . . ", the application can pattern match and substitute in web browser parameters that have been stolen from a legitimate user's computer. Alternatively, the stolen web browser parameters can be manually added or copied/pasted.

A company that operates and/or owns the web property can detect when data returned by a browser is modified in accordance with the first return data modification method by adding a digital signature. Significant effort would be required for an attacker to modify data returned by a browser in accordance with the first return data modification method without also modifying the digital signature in a detectable manner. As one example, an attacker could attempt to build a custom proxy for each company the malicious user wishes to attack. This is not scalable.

In the second return data modification method, which is generally more common, a malicious actor uses browser plugins, browser helper objects (BHO), or other extensions directly in the browser in order to modify data returned by the browser in a manner that will not modify the above-referenced digital signature in a detectable manner. The above-referenced browser extensions, and other tools, can allow a malicious user to replace hypertext transfer protocol (HTTP) headers as well as variables that are passed back from a browser to a web server. However, there are generally limits to how much the browser extensions and other tools discussed above can change.

Accordingly, as is discussed in greater detail below with reference to FIG. 1, the authentication system utilizes an order of HTTP headers and/or an order navigator object properties received from a browser in order to detect browser spoofing.

FIG. 1 is a functional block diagram of an example authentication environment 100 according to the principles of the present disclosure. As is illustrated in FIG. 1, the authentication environment includes user devices 104 and an authentication system 105, which are capable of communicating with each other via internet 108. The authentication system 105 includes an authentication module 110, a user credentials database 115, an HTTP header order/navigator object property order user history database 120 and an HTTP header order/navigator object property order reference database 130. In the example illustrated in FIG. 2, the user devices 104 include a smartphone 104-1 and a laptop 104-2. The user devices 104 are capable of running web browser applications by which users of the user devices 104 can access and log in to a web property associated with the authentication system 105.

Examples of the web property associated with the authentication system 105 include, but are not limited to, a website or webpage of any of an online banking service, an email service, a music and/or video streaming service, a social media service. The web property associated with the authentication system may be, for example, any internet-accessible website, webpage or online service that limits access to legitimate users of the website, webpage or online service.

Examples of legitimate users of the web property include a user who is authorized by a company that owns and/or operates the web property to access the web property, or a user that is registered with the web property to access the web property.

According to at least some example embodiments, each time a legitimate user logs in, the authentication system 105 stores order information in the user history database 120. The order information stored in the user history database 120 for each login may be or include, for example, an order (or a hash of the order) of HTTP headers and/or an order (or a hash of the order) of navigator object properties associated with the browser used by the legitimate user during the login. Then, during subsequent login attempts of an entity using credentials of the legitimate user, the authentication system 105 determines order information of the web browser of the entity; perform a comparison operation based on the order information of the legitimate user and the order information of the entity; and determine whether or not to allow the entity to log in to the web property based on a result of the comparison operation. For example, as will be discussed in greater detail below with reference to FIGS. 2 and 3, during subsequent login attempts by an entity claiming to be a legitimate user, the authentication system 105 may determine an order of HTTP headers and/or an order of navigator object properties associated with a browser being used by the entity, and the authentication system 105 may compare the determined order(s) (or hashes of the determined orders) with orders (or hashes of orders) of HTTP headers and/or orders (or hashes of orders) of navigator object properties that were previously stored for the legitimate user in the user history database 120 during previous logins of the legitimate user. In response to determining that there is no match, the authentication system 105 may determine that potential browser spoofing is occurring and require the entity to complete additional fraud protection procedures, such as the multi-factor authentication discussed above, before allowing the entity to log in.

Further, according to at least some example embodiments, the authentication system 105 may store, in the reference database 130, order information. The order information stored in the reference database 130 may be or include, for example, for each version of each of a plurality of browser families, an order (or a hash of the order) of HTTP headers and/or an order (or a hash of the order) of navigator object properties associated with the browser family and version. Further, each time an entity attempts to log in to the web property associated with the authentication system 105, the authentication system 105 receives, from a web browser of a first entity attempting to log in to a web property, credentials of a first user, determines order information of the web browser of the first entity, performs a comparison operation based on the reference order information and the order information of the first entity, and determines whether or not to allow the first entity to log in to the web property based on a result of the comparison operation. For example, each time an entity attempts to log in to the web property associated with the authentication system 105 with credentials of a legitimate user, the authentication system 105 can determine an order of HTTP headers and/or an order of navigator object properties associated with a browser being used by the entity, lookup the browser family and version corresponding to the determined order of HTTP headers and/or order of navigator object properties from the reference database 130, and determine if the looked-up corresponding browser family and version matches the browser family and version identified by a user agent HTTP header and/or user agent navigator object property of the browser being used by the entity. In response to determining that there is no match, the authentication system 105 may determine that potential browser spoofing is occurring and require the entity to complete additional fraud protection procedures, such as the multi-factor authentication discussed above, before allowing the entity to log in.

Thus, the authentication system 105 enhances a process of authorizing users to log in to the web property associated with the authentication system 105 by detecting inauthentic, malicious actors who use web spoofing to impersonate a legitimate user of the web property in an attempt to access the web property. Operations of the authentication system 105 will now be discussed in greater detail below with reference to FIGS. 2-5.

Figure 2:
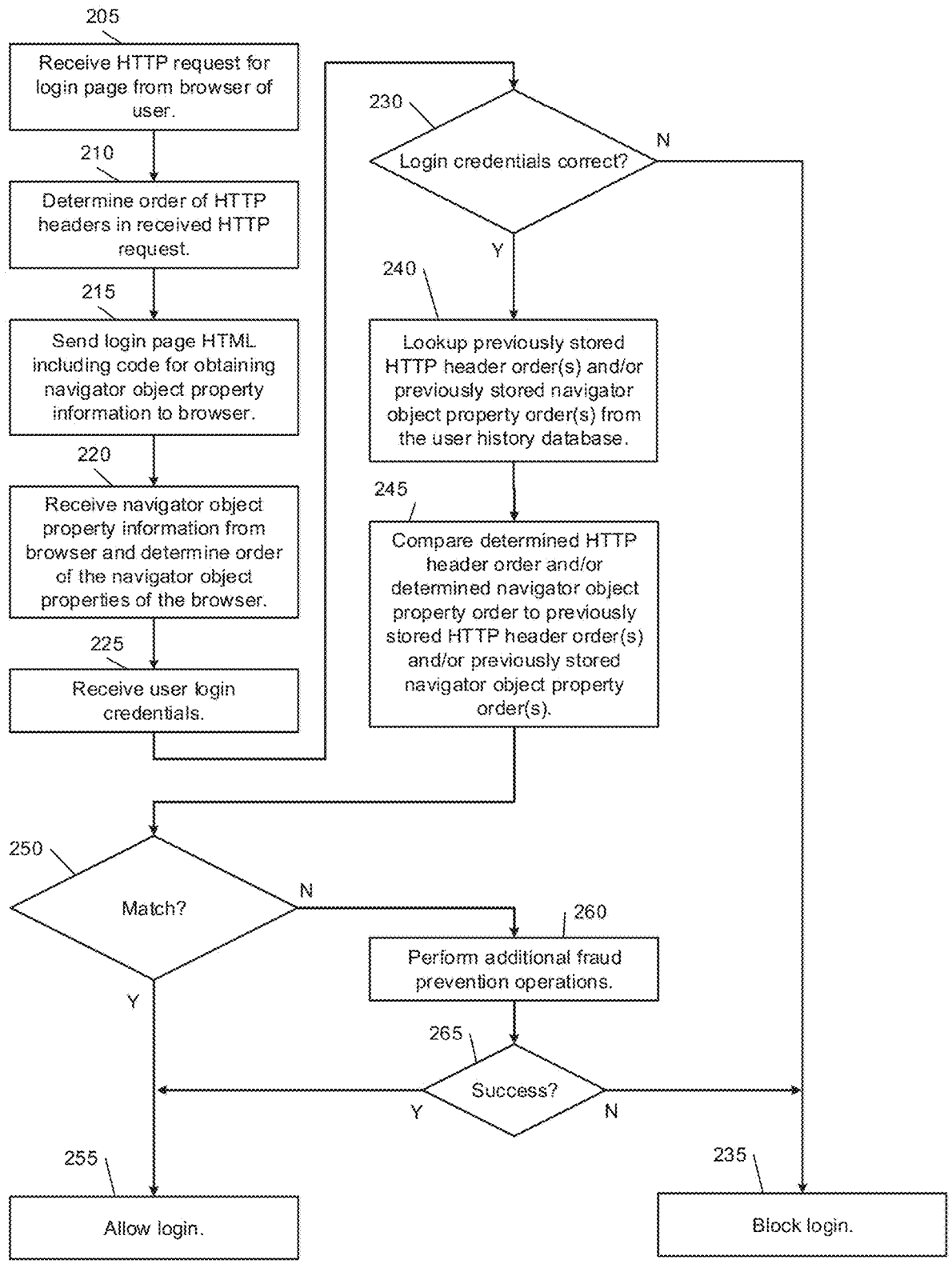
FIG. 2 is a flowchart depicting an example authorization process that uses hypertext transfer protocol (HTTP) header order(s) and/or navigator object property order(s) that have been previously stored for a user in a user history database according to the principles of the present disclosure.

FIG. 2 is a flowchart depicting an example authorization process that uses HTTP header order(s) and/or navigator object property order(s) which have been previously stored for a user in a user history database according to the principles of the present disclosure. For the purpose of simplicity, the example authorization process of FIG. 2 will be explained with reference to an example in which the laptop 104-2 is being used by an entity attempting to access the web property associated with the authentication system 105 using the credentials of a legitimate user of the web property associated with the authentication system 105. As used in the present disclosure, the terms website, webpage and web browser may be used interchangeably with, and should be considered synonymous with, the terms site, page and browser, respectively.

Referring to FIG. 2, in operation 205, the authentication module 110 receives a HTTP request for a login webpage of the web property associated with the authentication system 105 from a web browser running on the laptop 104-2. The HTTP request includes HTTP headers. In operation 210, the authentication module determines an order of the HTTP headers included in the HTTP request for example by storing the name of each HTTP header in a data object (e.g., such as a vector, array or string) in the same order in which the HTTP headers appear in the HTTP request.

In operation 215, the authentication module 110 responds to the HTTP request for the login page by sending the web browser of the laptop 104-2 a hypertext markup language (HTML) document that includes code for obtaining navigator object property information. For example, in operation 215 the authentication module 110 may send the web browser of the laptop 104-2 an HTML document for rendering the login page. The authentication module 110 may include, in the HTML document, navigator object property information obtaining code (e.g., JavaScript® code) for causing the web browser of the laptop 104-2 to: walk a navigator object of the web browser by reading each property of the navigator object; store each read navigator object property in an data object (e.g., such as a vector, array or string) in the same order in which the properties exist in the navigator object; and send navigator object property information to the authentication module 110 in the form of the data object including the navigator properties. The reading of the properties may include reading both the names of the properties and the values of the properties. Thus, the navigator object property information may indicate the names of all the properties included in the navigator object, the order in which the properties of the navigator object are arranged, and the values of the properties of the navigator object.

In operation 220, the authentication module 110 receives navigator object property information from the web browser of the laptop 104-2 and determines an order of the navigator object properties. For example, when the web browser of the laptop 104-2 renders the login page defined by the HTML document that was sent by the authentication module 110 to the web browser of the laptop 104-2 in operation 215, the web browser will execute the navigator object property information obtaining code included in the HTML document and send the navigator object property information to the authentication module 110. As is discussed above with reference to operation 215, the navigator object property information may indicate the names of all the properties included in the navigator object of the web browser of the laptop 104-2, the order in which the properties of the navigator object are arranged, and the values of the properties of the navigator object. Accordingly, in operation 220, the authentication module 110 may use the received navigator object property information to determine an order of the navigator object properties of the web browser of the laptop 104-2.

In operation 225, the authentication module 110 receives login credentials from the web browser of the laptop 104-2. For example, in operation 225, the authentication module 110 may receive, via the internet 108, a user name and password that have been entered into the login page via the web browser of the laptop 104-2.

In operation 230, the authentication module 110 may determine whether the received login credentials are correct. For example, the authentication module 110 may use the user credentials database 115, which stores information for checking user credentials, in order to check whether the credentials received in operation 225 are accurate credentials of a legitimate user. For example, the user credentials database 115 may store usernames of legitimate users of the web property of the authentication system 105 as well and passwords (or other information that can be used to check passwords, such as hashes of passwords). If, in operation 230, the authentication module determines that the received login credentials are not correct, the authentication module 110 proceeds to operation 235. In operation 235, the authentication module blocks the login attempt of the web browser of the laptop 104-2. Alternatively, if, in operation 230, the authentication module determines that the received login credentials are correct, the authentication module proceeds to operation 240.

In operation 240, the authentication module 110 looks up HTTP header order(s) and/or navigator object property order(s) that were previously stored in the user history database 120 in connection with previous successful logins of the user identified by the credentials received in operation 225. For example, FIG. 3 illustrates example contents of the user history database 120 according to the principles of the present disclosure. The example shown in FIG. 3 illustrates a user history 300 of single legitimate user including four entries corresponding, respectively, to four successful logins (i.e., logins 1-4). For the purpose of simplicity, user history 300 is illustrated in FIG. 3 as including only 4 entries. However, according to example embodiments, user history 300 can include any number of entries, depending on a number of times the legitimate user corresponding to user history 300 has successfully logged in to the web property associated with the authentication system 105. According to at least some example embodiments, each entry of each user history 300 may include: a login number 310 that identifies the login corresponding to the entry; an HTTP header order 320 that indicates the order, determined by the authentication module 110, of the HTTP headers of an HTTP request received by the authentication module 110 during the login corresponding to the entry; and a navigator object property order 330 that indicates the order, determined by the authentication module 110, of the navigator object properties of the web browser used during the login corresponding to the entry.

For example, in the example illustrated in FIG. 3, the first six HTTP headers in the HTTP header order 320 determined by the authentication module 110 in association with login 1 of user history 300 were: the "Host," "Connection," "UserAgent," "Accept," "Referrer," and "Accept-Language" HTTP headers. Further, the first six navigator object property headers in the navigator object property order determined by the authentication module 110 in association with login 1 of user history 300 were: the "userAgent," "product," "language," "appCodeName," "appVersion," and "cookieEnabled" navigator object properties. For the purpose of simplicity only the first six HTTP headers of each HTTP header order 320 and the first 6 navigator object properties of each navigator object property order 330 are illustrated in FIG. 3. However, according to example embodiments, an HTTP header order 320 determined by the authentication module 110 may include more or less than six HTTP headers in total and a navigator object property order 330 determined by the authentication module 110 may include more or less than six navigator object properties in total.

As is also illustrated in FIG. 3, each history entry may also include and order hash 340. According to at least some example embodiments, when the authentication module 110 determines an HTTP header order 320 or a navigator object property order 330, the authentication module 110 may use a hash function (e.g., secure hash algorithm 1 (SHA-1) or any known hash function) to generate, as the order hash 340, a hash value based on the HTTP header order 320 and/or the navigator object property order 330. For example, the order hash 340 may be a hash of the HTTP header order 320, a hash of the navigator object property order 330, or a hash of a combination (e.g., concatenation) of the HTTP header order 320 and the navigator object property order 330. As another example, the order hash 340 may include both a hash of the HTTP header order 320 and a hash of the navigator object property order 330. As another example, the order hash 340 may include a hash of a portion of the HTTP header order 320, a hash of a portion of the navigator object property order 330, or a hash of a combination of portions of the HTTP header order 320 and the navigator object property order 330.

Returning to FIG. 2, in operation 240 the authentication module 110 may look up the user history 300 corresponding to the user identified by the credentials received in operation 225.

In operation 245, the authentication module 110 may compare the HTTP header order determined in operation 210 to the HTTP header orders 320 of the looked up user history 300 and/or compare the navigator object property order determined in operation 220 to the navigator object property orders 330 of the looked up user history 300. Alternatively, in operation 245, the authentication module 110 may generate a hash value based on the HTTP header order determined in operation 210 and/or the navigator object property order determined in operation 220 and compare the generated hash value to the order hashes 340 the looked up user history 300.

In operation 250, the authentication module 110 determines whether the comparisons performed in operation 245 resulted in a match. For example, the authentication module 110 may determine whether the HTTP header order determined in operation 210 and/or the navigator object property order determined in operation 220 (or hash value thereof) match at least one of the HTTP header orders 320 and/or the navigator object property orders 330 of the looked up user history 300 (or hash value thereof). If, in operation 250, the authentication module 110 determines that a match exists, the authentication module 110 proceeds to operation 255.

In operation 255, the authentication module 110 allows the login. For example, in operation 255, the authentication module determines that the entity attempting to log in to the web property associated with the authentication system 105 is a legitimate user and allows the legitimate user to log in. According to at least some example embodiments, in operation 255, in addition to allowing the login, the authentication module 110 stores the HTTP header order determined in operation 210 as a new HTTP header order 320 of the user history 300 looked up in operation 240 and stores the navigator object property order determined in operation 220 as a new navigator object property order 330 of the user history 300. Further, the authentication module may calculate a hash based on the HTTP header order determined in operation 210 and/or the navigator object property order determined in operation 220, and store the generated hash as a new order hash 340 of the user history 300 looked up in operation 240.

Returning to operation 250, if, in operation 250, the authentication module 110 determines that a match does not exist, the authentication module 110 proceeds to operation 260.

In operation 260, the authentication module 110 initiates additional fraud prevention operations. The additional fraud prevention operations may include, for example, requiring multi-factor authentication (e.g., two-factor authentication) by requesting one or more authentication factors in addition to the user credentials (e.g., user name and password). Examples of additional fraud prevention operations that use additional authentication factors include, but are not limited to, requiring entry of a one-time password or code generated by an authenticator application installed on the legitimate user's phone or computer or emailed to the legitimate user's email address, and requiring entry of biometric data (e.g., fingerprint(s), iris scan, facial recognition, voice recognition, etc.) to check against previously registered biometric data of the legitimate user.

In operation 265, the authentication module 110 determines whether the entity attempting to log in to the web property associated with the authentication system 105 successfully passed the additional fraud prevention operations. If the authentication module 110 determines the entity succeeded, the authentication module 110 proceeds to operation 255 and allows the login. Otherwise, the authentication module 110 proceeds to operation 235 and blocks the login. Operations 235 and 255 are each described above, and thus, will not described again here.

Figure 4:
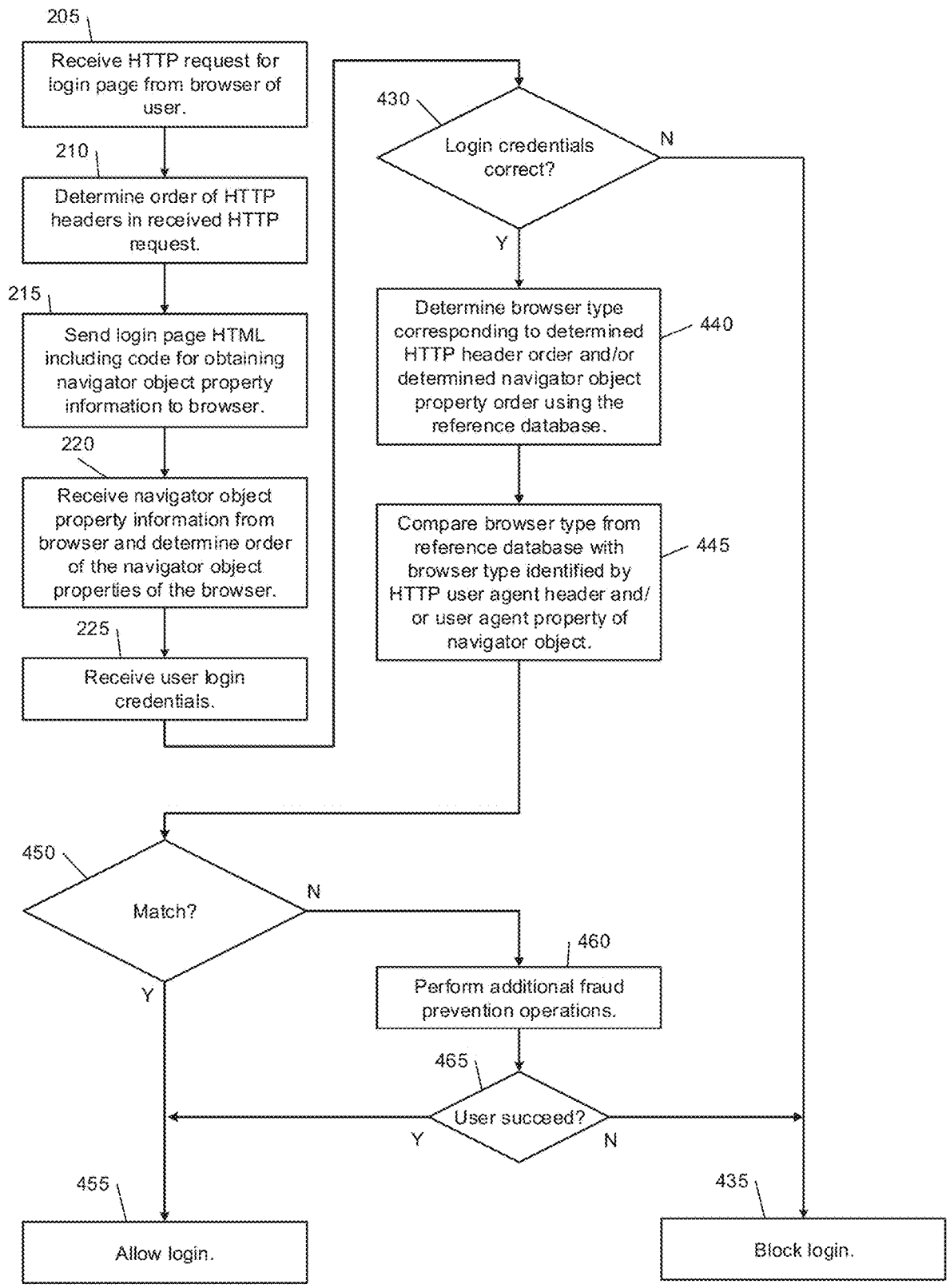
FIG. 4 is a flowchart depicting an example authorization process that uses reference HTTP header order(s) and/or navigator object property order(s) of a reference database according to the principles of the present disclosure.

FIG. 4 is a flowchart depicting an example authorization process that uses reference HTTP header order(s) and/or navigator object property order(s) of a reference database according to the principles of the present disclosure. In comparison with the authorization process of FIG. 2, the authorization process of FIG. 4 does not necessarily rely on historical activity data stored in accordance with successful logins of legitimate users. As is discussed in greater detail below, in accordance with the authorization process of FIG. 4, the authentication system 105 uses a set of reference orders, which are stored in the reference database 130 and include a reference order (i.e., a reference HTTP header order and/or a reference navigator object property order) corresponding to each of a plurality of versions of each of a plurality of browser families.

For the purpose of simplicity, the example authorization process of FIG. 4 will be explained with reference to an example in which the laptop 104-2 is being used by an entity attempting to access the web property associated with the authentication system 105 using the credentials of a legitimate user of the web property associated with the authentication system 105.

Referring to FIG. 4, operations 205-225 of FIG. 4 are performed in the same manner as that described above with reference to FIG. 2. Accordingly, descriptions of operations 205-225 are not repeated here.

In operation 530, the authentication module 110 may determine whether the login credentials received in operation 225 are correct in the same manner discussed above with respect to operation 230 of FIG. 2. If, in operation 530, the authentication module 110 determines that the received login credentials are not correct, the authentication module 110 proceeds to operation 535. In operation 535, the authentication module blocks the login attempt of the web browser of the laptop 104-2. Alternatively, if, in operation 530, the authentication module determines that the received login credentials are correct, the authentication module proceeds to operation 540.

In operation 440, the authentication module 110 determines a browser type corresponding to the HTTP header order determined in operation 210 and/or the navigator object property order determined in operation 220 from the reference database 130. For example, in operation 440, the authentication system 105 may use the set of reference orders, which are stored in the reference database 130 and include a reference order (i.e., a reference HTTP header order and/or a reference navigator object property order) corresponding to each of a plurality of versions of each of a plurality of browser families, in order to determine the type of web browser actually being used by the entity attempting to log in to the web property.

Figure 5:
FIG. 5 illustrates example contents of the HTTP header/navigator object property order reference database according to the principles of the present disclosure.

For example, FIG. 5 illustrates example contents of the reference database 130 according to the principles of the present disclosure. For the purpose of simplicity, the example contents of the reference database 130 illustrate reference orders for only 4 browser types 550: browser A family, version 1; browser A family, version 2; browser B family, version 1; and browser B family, version 2. However, according to at least some example embodiments, the reference database 130 may store reference orders for any number of versions of any number of browser families. The term browser family refers to a name or brand of a web browser, and a browser version is a particular version (e.g., release) of a browser family. For example, each one of MOZILLA FIREFOX, MICROSOFT INTERNET EXPLORER, and GOOGLE CHROME is an example of browser family having multiple browser versions. As is illustrated in FIG. 5, for each of a plurality of browser types, the reference database 130 stores a reference HTTP header order 560, a reference navigator object property order 570, and/or a reference order hash 580 corresponding to the browser type.

According to at least some example embodiments, the authentication module 110 may use a hash function (e.g., secure hash algorithm 1 (SHA-1) or any known hash function) to generate, as the reference order hash 580, a hash value based on the reference HTTP header order 560 and/or the reference navigator object property order 570. For example, for each browser type 550, the reference order hash 580 may be a hash of the reference HTTP header order 560, a hash of the reference navigator object property order 570, or a hash of a combination (e.g., concatenation) of the reference HTTP header order 560 and the reference navigator object property order 570. As another example, the reference order hash 580 may include both a hash of the reference HTTP header order 560 and a hash of the reference navigator object property order 570. As another example, the reference order hash 340 may include a hash of a portion of the reference HTTP header order 560, a hash of a portion of the reference navigator object property order 570, or a hash of a combination of portions of the reference HTTP header order 560 and the reference navigator object property order 570.

Accordingly, returning to operation 440, the authentication module 110 may find, in the reference database 130, the reference order (or order hash) that matches the HTTP header order determined in operation 210, the navigator object property order determined in operation 220, and/or a hash value calculated based on the HTTP header order determined in operation 210 and/or the navigator object property order determined in operation 220. Further, the authentication module 110 may identify the browser type that is mapped to by the matching reference order (or order hash) in the reference database 130 as the type of web browser that is actually being used by the entity attempting to log in to the web property associated with the authentication system 105.

Next, in operation 445, the authentication module 110 compares the browser type determined in operation 440 to a browser type identified by a user agent HTTP header and/or a user agent navigator object property received at the authentication module 110 from the web browser of the entity attempting to log in to the web property associated with the authentication system 105.

In operation 450, the authentication module 110 determines whether the comparisons performed in operation 245 resulted in a match. For example, the authentication module 110 may determine whether the browser type determined in operation 440 matches the user agent HTTP header and/or the user agent navigator object property received at the authentication module 110 from the web browser of the entity attempting to log in to the web property associated with the authentication system 105. If, in operation 450, the authentication module 110 determines that a match exists, the authentication module 110 proceeds to operation 455.

In operation 455, the authentication module 110 allows the login. For example, in operation 455, the authentication module determines that the entity attempting to log in to the web property associated with the authentication system 105 is a legitimate user and allows the legitimate user to log in.

Returning to operation 450, if, in operation 450, the authentication module 110 determines that a match does not exist, the authentication module 110 proceeds to operation 460.

In operation 460, the authentication module 110 initiates additional fraud prevention operations in the same manner discussed above with respect to operation 260 of FIG. 2. Thus, if the type of web browser actually being used by the entity attempting to log in to the web property differs from the type of web browser identified by the user agent HTTP header and/or the user agent navigator object property returned to the authentication module 110 by the entity's web browser, then the authentication system 105 may determine that potential web spoofing is occurring, and the authentication system 105 may require additional fraud prevention operations.

Next, in operation 465, the authentication module 110 determines whether the entity attempting to log in to the web property associated with the authentication system 105 successfully passed the additional fraud prevention operations of operation 460. If the authentication module 110 determines the entity succeeded, the authentication module 110 proceeds to operation 455 and allows the login. Otherwise, the authentication module 110 proceeds to operation 435 and blocks the login. Operations 435 and 455 are each described above, and thus, will not described again here.

Accordingly, even if a malicious actor user browser plugins, browser helper objects (BHO), or other extensions or tools directly in a web browser in order to modify data returned by the browser and to playback web browser features harvested from a legitimate user of the web property associated with the authentication system 105, the authentication system 105 may still use an order of HTTP headers returned by the browser and/or an order of navigator object properties returned by the browser to detect web spoofing, and prevent malicious user from utilizing web spoofing to circumvent fraud detection.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An authentication system comprising:
   at least one memory, wherein the memory stores instructions and order information of a first user, the order information of the first user including, for each login, among a plurality of times the first user logged in to a web property associated with the authentication system, at least one of an indication of an order of hypertext transfer protocol (HTTP) headers that were previously received from a web browser of the first user during the login or an indication of an order of navigator object properties that were previously returned by a web browser of the first user during the login; and
   at least one processor configured to execute the instructions and cause the authentication system to perform,
      receiving, from a web browser of a first entity attempting to log in to a web property, credentials of the first user,
      determining order information of the web browser of the first entity, the order information of the web browser of the first entity including at least one of an indication of an order of HTTP headers included in an HTTP request of the web browser of the first entity or an indication of an order of navigator object properties of the web browser of the first entity, and
determining whether to allow the first entity to log in to the web property based on a comparison of the order information of the first user and the order information of the first entity.

2. The authentication system of claim 1, wherein the processor is further configured to execute instructions to cause the authentication system to perform:
receiving an HTTP request from the web browser of the first entity; and
responding to the HTTP request by sending to the web browser of the first entity a hypertext markup language (HTML) document defining a webpage,
wherein the HTML document includes code for causing the web browser of the first entity to
walk a navigator object of the web browser by reading each property of the navigator object,
store each read navigator object property in a data object in the same order in which the properties exist in the navigator object, and
send, to the at least one processor, navigator object property information indicating the order of the properties of the navigator object of the web browser of the first entity.

3. The authentication system of claim 1, wherein the processor is further configured to execute instructions to cause the authentication system to perform requesting one or more authentication factors from the first entity, in addition to the credentials of the first user, based on the order information of the first user and the order information of the first entity.

4. The authentication system of claim 1, wherein the processor is further configured to execute instructions to cause the authentication system to perform:
determining whether the order of HTTP headers included in an HTTP request of the web browser of the first entity matches at least one of the orders of HTTP headers indicated by the order information of the first user; and
determining whether the order of navigator object properties of the web browser of the first entity matches at least one of the orders of navigator object properties indicated by the order information of the first user.

5. The authentication system of claim 1, wherein the order information of the first user includes order information corresponding to at least one of at least two different web browsers of two different versions of a web browser family, respectively, or at least two different web browsers of two different web browser families, respectively.

6. The authentication system of claim 4, wherein the first entity is allowed to log in to the web property if the order of HTTP headers included in the HTTP request of the web browser of the first entity matches at least one of the orders of HTTP headers indicated by the order information of the first user or the order of the navigator object properties of the web browser of the first entity matches at least one of the orders of navigator object properties indicated by the order information of the first user.

7. The authentication system of claim 1, wherein the indication of the order of HTTP headers that were previously received from a web browser of the first user during the login includes a hash of the order of the HTTP headers that were previously received from a web browser of the first user during the login.

8. The authentication system of claim 1, wherein the indication of the order of navigator object properties that were previously returned by a web browser of the first user during the login includes a hash of the order of navigator object properties that were previously returned by a web browser of the first user during the login.

9. An authentication system comprising:
at least one memory, wherein the memory stores instructions and a reference database storing reference order information, the reference order information including, for each web browser type among a plurality of web browser types, at least one of an indication of an order of hypertext transfer protocol (HTTP) headers included in an HTTP request of the web browser type or an indication of an order of navigator object properties of the web browser type; and
at least one processor configured to execute the instructions and cause the authentication system to perform,
receiving, from a web browser of a first entity attempting to log in to a web property, first credentials of a first user,
determining order information of the web browser of the first entity, the order information of the web browser including at least one of an indication of an order of HTTP headers included in an HTTP request of the web browser of the first entity or an indication of an order of navigator object properties of the web browser of the first entity,
requesting one or more authentication factors from the first entity, different from the first credentials of the first user, based on the reference order information, the order information of the web browser of the first entity, and the first credentials of the first user, and
determining whether to allow the first entity to log in to the web property based on the one or more authentication factors, the order information of the web browser of the first entity, and the reference order information.

10. The authentication system of claim 9, wherein the processor is further configured to execute instructions to cause the authentication system to perform:
receiving an HTTP request from the web browser of the first entity; and
responding to the HTTP request by sending to the web browser of the first entity a hypertext markup language (HTML) document defining a webpage;
wherein the HTML document includes code for causing the web browser of the first entity to
walk a navigator object of the web browser by reading each property of the navigator object;
store each read navigator object property in a data object in the same order in which the properties exist in the navigator object; and
send, to the at least one processor, navigator object property information indicating the order of the properties of the navigator object of the web browser of the first entity.

11. The authentication system of claim 9, wherein the requesting of one or more authentication factors includes requesting the one or more authentication factors in response to the reference order information and the order information of the first entity being different.

12. The authentication system of claim 9, wherein the processor is further configured to execute instructions to cause the authentication system to perform:
determining whether a browser type, from among the plurality of web browser types, that corresponds to the order of HTTP headers included in an HTTP request of the web browser of the first entity matches a browser type identified by a user agent HTTP header of the web browser of the first entity or a user agent property of the navigator object properties of the web browser of the first entity; and determining whether a browser type, from among the plurality of web browser types, that corresponds to the order of navigator object properties of the web browser of the first entity matches a browser type identified by the user agent HTTP header of the web browser of the first entity or the user agent property of the navigator object properties of the web browser of the first entity.

13. A method of operating an authentication system, the authentication system including at least one memory configured to store order information of a first user, the order information of the first user including, for each login, among a plurality of times the first user logged in to a web property associated with the authentication system, at least one of an indication of an order of hypertext transfer protocol (HTTP) headers that were previously received from a web browser of the first user during the login or an indication of an order of navigator object properties that were previously returned by a web browser of the first user during the login, the method comprising:

receiving, from a web browser of a first entity attempting to log in to a web property, credentials of the first user;

determining order information of the web browser of the first entity, the order information of the web browser of the first entity including at least one of an indication of an order of HTTP headers included in an HTTP request of the web browser of the first entity or an indication of an order of navigator object properties of the web browser of the first entity; and determining whether to allow the first entity to log in to the web property based on a comparison of the order information of the first user and the order information of the first entity.

14. The method of claim 13, further comprising:

receiving an HTTP request from the web browser of the first entity; and responding to the HTTP request by sending to the web browser of the first entity a hypertext markup language (HTML) document defining a webpage, wherein the HTML document includes code for causing the web browser of the first entity to walk a navigator object of the web browser by reading each property of the navigator object, store each read navigator object property in a data object in the same order in which the properties exist in the navigator object, and send, to a processor of the authentication system, navigator object property information indicating the order of the properties of the navigator object of the web browser of the first entity.

15. The method of claim 13, further comprising:

requesting one or more authentication factors from the first entity, in addition to the credentials of the first user, based on the first user and the order information of the first entity.

16. The method of claim 13, further comprising:

determining whether the order of HTTP headers included in an HTTP request of the web browser of the first entity matches at least one of the orders of HTTP headers indicated by the order information of the first user; and determining whether the order of navigator object properties of the web browser of the first entity matches at least one of the orders of navigator object properties indicated by the order information of the first user.

17. A method of operating an authentication system, the authentication system including at least one memory configured to store a reference database including reference order information, the reference order information including, for each web browser type among a plurality of web browser types, at least one of an indication of an order of hypertext transfer protocol (HTTP) headers included in an HTTP request of the web browser type or an indication of an order of navigator object properties of the web browser type, the method comprising:

receiving, from a web browser of a first entity attempting to log in to a web property, first credentials of a first user;

determining order information of the web browser of the first entity, the order information of the web browser including at least one of an indication of an order of HTTP headers included in an HTTP request of the web browser of the first entity or an indication of an order of navigator object properties of the web browser of the first entity;

requesting one or more authentication factors from the first entity, different from the first credentials of the first user, based on the reference order information, the order information of the web browser of the first entity, and the first credentials of the first user; and determining whether to allow the first entity to log in to the web property based on the one or more authentication factors, the reference order information, and the order information of the web browser of the first entity.

* * * * *